March 5, 1935.  E. FRISCHMUTH ET AL  1,993,000
LOAD EQUALIZING SYSTEM
Filed Jan. 25, 1933
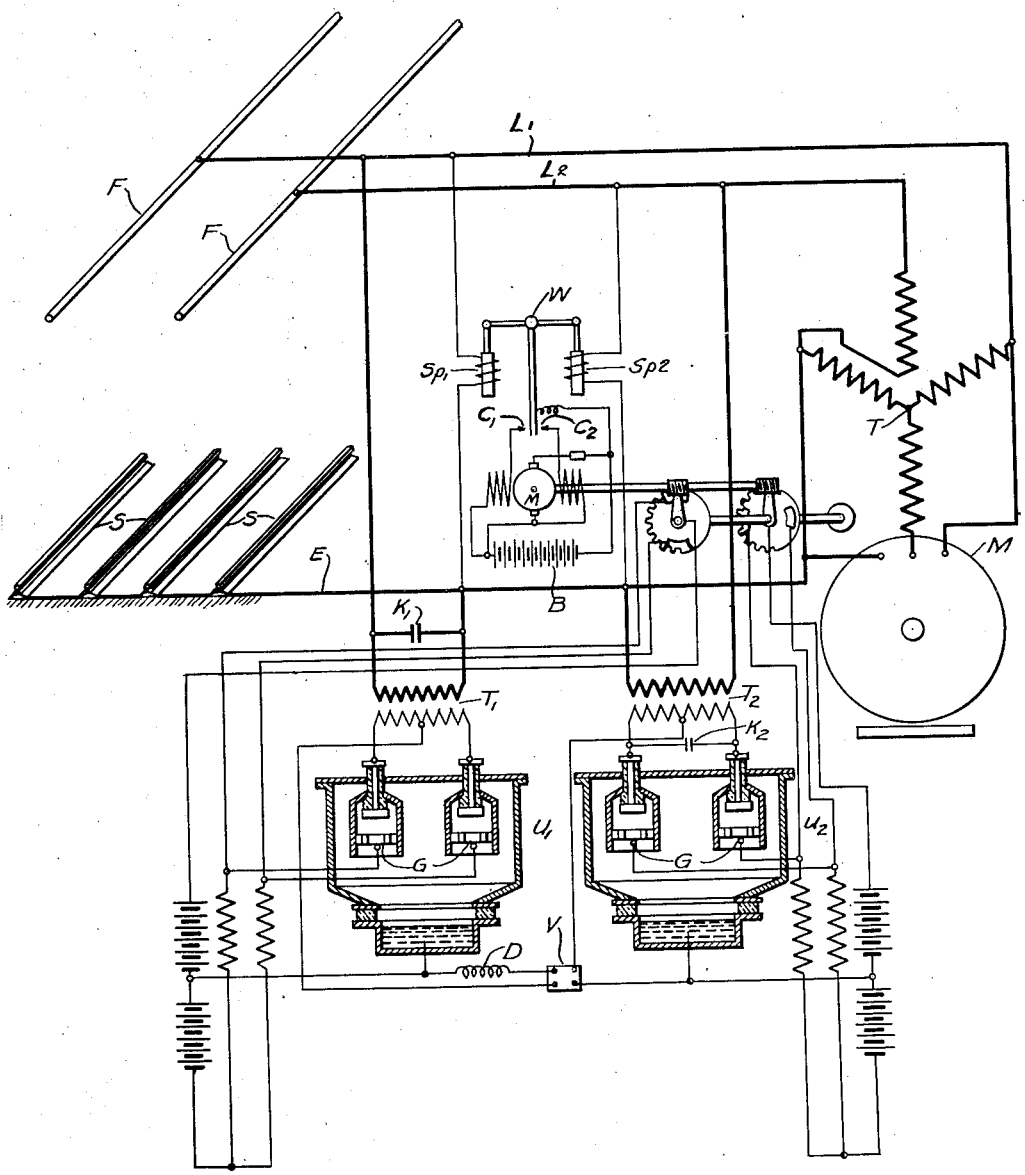
WITNESSES:
INVENTORS
Emmerich Frischmuth &
Moritz Schenkel
BY
ATTORNEY Patented Mar. 5, 1935

1,993,000

UNITED STATES PATENT OFFICE 1,993,000

LOAD EQUALIZING SYSTEM

Emmerich Frischmuth, Berlin-Dahlem, and Moritz Schenkel, Berlin-Charlottenburg, Germany, assignors to Westinghouse Electric & Manufacturing Company, New York, N. Y., a corporation Application January 25, 1933, Serial No. 653,490
In Germany February 6, 1932

5 Claims. (Cl. 171—97)

Our invention relates to a load equalizing system and particularly for a plurality of single phase systems drawing the balanced load from a polyphase source of current. When generating alternating current, it has usually been found desirable to generate polyphase currents, usually three-phase. However, for many power applications, particularly in railroad traction applications, it is desirable to use single phase current as the distribution system becomes too complicated for ready application for movable contacts such as trolleys.

In order to meet this arrangement for single phase applications, it has been customary to divide the load system into a plurality of sections and to feed each section with single phase current from one phase of the generator system. However, this has frequently been undesirable as load concentrations may seriously unbalance the phase currents required from the generator. It has heretofore been proposed to partially equalize these currents by using a Scott-connected transformer between the alternating current generator and the single phase load systems. However, even with the Scott-connected system supplying two single phase connections there may be serious unbalance in the phase currents in the generator.

It is an object of our invention to provide means for drawing current from the lightly loaded section to supply to the heavily loaded section and thus substantially balance the phase currents drawn from the generator. According to our invention, the single phase systems are interconnected by a plurality of series connected vapor electric converters which are controlled by suitable grids to draw current from the lightly loaded section and redeliver the current to the heavily loaded section.

Other objects and advantages will be apparent from the following detailed description taken in conjunction with the accompanying drawing in which the single figure is a schematic illustration of a load system embodying my invention.

A suitable generator M of polyphase currents is connected through a Scott-connected transformer T to a plurality of single phase load systems L1 and L2, these load systems being in turn connected to suitable sections of single phase load represented by the overhead trolleys F and the track or ground returns S, the ground returns being in turn connected to a suitable conductor C which forms the common return for both of the single phase load systems. Connected across the single phase load L1 by means of a transformer T1 is a vapor electric converter U1 having a plurality of anodes controlled by suitable grids G.

In a similar manner a rectifier U2 is connected across a single phase load L2 by means of a transformer T2. The cathode of the rectifier U1 is connected to the mid point of the secondary of the transformer T2 through a suitable energy storing device such as a reactor D. The cathode of the rectifier U2 is likewise connected to the mid point of the secondary of the rectifier T1. Suitable commutating condensers K1 and K2 are provided for the respective rectifier transformers T1, T2.

The grid control system for controlling the direction of current flow through the rectifiers comprises voltage coils SP1 and SP2 connected respectively across the single phase loads L1 and L2. The voltage coils SP1 and SP2 are connected to opposite ends of a balance arm W which controls suitable contactors C1 and C2 which are connected to opposed fields of the direct current motor $m$ which is supplied with energy by a suitable battery B. Driven by the motor $m$ are a plurality of drum contactors having oppositely disposed contacts adapted for connection to the grids of the rectifiers. While any suitable source of grid potential may be used, we prefer to use a battery supplying a constant negative potential to the grids through suitable resistors and to periodically apply positive potential to the grids to counterbalance the constant negative bias.

In the operation of our device the lightly loaded system, assuming for purposes of illustration the load L1 is lightly loaded, the voltage coil SP1 will move the contact finger to close contact C2 and operate the motor to rotate the drums through 180° so that the grids G of rectifier U1 will be released to allow current to flow through the reactor D to the midpoint of the transformer T2 and rectifier U2. At a later time the grids G of the rectifier U2 will be released to allow current to flow alternately in the anodes of the rectifier U2, in this manner generating a voltage in the primary of the generator T2 which returns current to the load L2. In a similar manner, if the line L1 should be loaded heavier than the line L2, the voltage coil SP2 would reverse the arm W and close the contact C1, reversing the direction of rotation of the motor which reverses the drums to release first the grids of the rectifier U2 to permit current to flow therein and later releasing the grids G of the rectifier U1 to flow alternately therein and thereby reduce the voltage in the transformer R1 which will return current to the heavily loaded line L1.

While we have shown and described a specific embodiment of our invention, it will be apparent that changes and modifications can be made therein without departing from the spirit and scope of our invention.

We claim as our invention:

1. An arrangement for equalizing the load taken from a polyphase system by a plurality of single phase load systems comprising a vapor electric rectifier connected to each of said single phase systems, means for connecting said rectifiers in series relation and a relay responsive to the load conditions of the single phase lines for controlling the direction of flow of current through said rectifiers.

2. A load equalizing system comprising a plurality of single phase distribution systems, a vapor electric converter connected to each of said systems, means for connecting said converters in series relation, grids for controlling the operation of said vapor electric converters, and a grid control system responsive to the load conditions of the line for opening the grids in said converters to permit current flow from the lightly loaded system to the heavily loaded system.

3. A distribution system comprising a pair of single phase load circuits, a transformer connected across each of said circuits, a relay responsive to the voltage of said circuit, a vapor electric rectifier fed from each of said transformers, grids in said rectifiers, a rotary controller for supplying control current to said grids, the direction of rotation being controlled by said relay.

4. A vapor electric converter comprising a plurality of arc discharge devices, said devices connected in series relationship, grids for controlling the flow of current through said discharge devices, and a grid control device for controlling the direction of flow of the current through said discharge devices.

5. A distribution system comprising a plurality of single phase lines, a transformer connected across each line, a vapor electric converter connected to each of said transformers, the cathodes of each of said converters being connected to the said point of the alternate transformer, and grid control means responsive to the load on said lines for feeding current through said converters to the heavily loaded line.

EMMERICH FRISCHMUTH.
MORITZ SCHENKEL.